United States Patent Office 3,447,764
Patented June 3, 1969

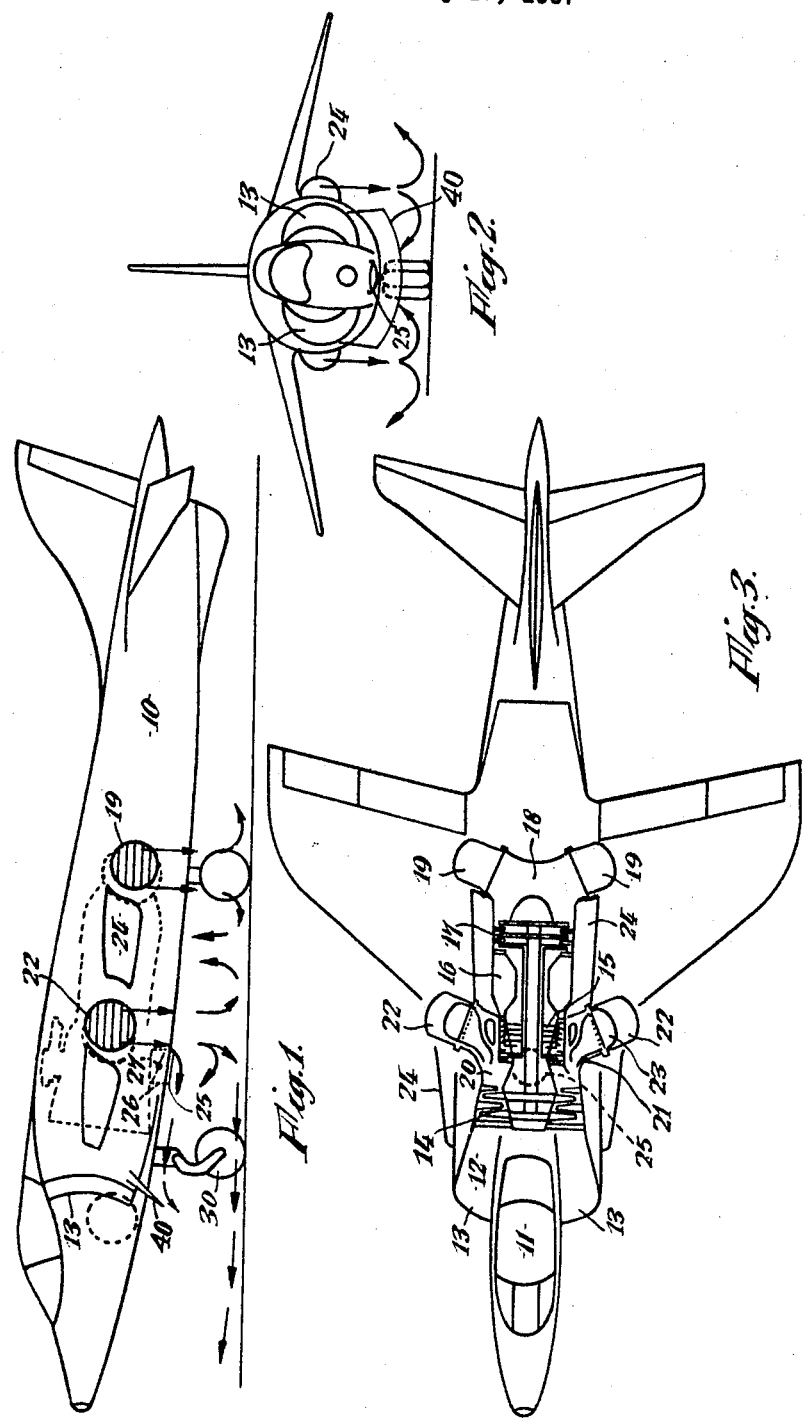

3,447,764
AIRCRAFT WITH JET PROPULSION ENGINE
Ralph Murch Denning, London, England, and Heinrich Hertel and Siegfried Harmsen, Berlin, Germany, assignors to Bristol Siddeley Engines Limited, London, England, a British company
Filed May 17, 1967, Ser. No. 639,225
Claims priority, application Great Britain, May 21, 1966, 22,761/66
Int. Cl. B64d 27/20
U.S. Cl. 244—53                                    6 Claims

ABSTRACT OF THE DISCLOSURE

When vertical or short take-off and landing aircraft are hovering stationary near the ground the downward propulsion jets are deflected by the ground to cause upcurrents which can be ingested at the engine intake. This hot air ingestion causes loss of thrust and in addition debris from the ground can be ingested. The invention concerns the provision of an additional gas jet for deflecting the upcurrents away from the engine intake so as to prevent ingestion.

---

This invention relates to an aircraft with a jet propulsion engine.

The invention is particularly but not exclusively applicable to an aircraft having one or more jet propulsion engines of the kind which are arranged to provide vertical or short take-off and landing (V/S.T.O.L.) capability and which may include auxiliary combustion systems for increasing the thrust.

The engine may be a gas turbine engine which may have an auxiliary combustion system in a bypass air duct which is brought into operation to provide extra thrust for V.T.O. (vertical take-off).

Where a propulsion nozzle discharges warm or hot gas downwards near an opening for an intake of a jet engine there is a danger during the intial phase of a V.T.O. that some of the gas discharged from the nozzle will travel towards the engine intake and be sucked into the engine. Such ingestion by the engine will adversely affect theengine performance and a considerable reduction in thrust may be incurred. In addition, a high velocity jet of hot gas which strikes the ground may cause debris to be ingested by the engine, possibly with harmful effects.

According to the invention there is provided an aircraft comprising an engine, at least one propulsion nozzle capable of downward discharge, an intake opening of the engine, and an additional nozzle capable of discharge to prevent the discharge from the propulsion nozzle entering the engine intake opening.

According to one aspect of the invention there is provided an aircraft comprising an engine, an intake opening for the engine, at least one propulsion nozzle located near the intake opening and capable of downward discharge, an additional nozzle located between the propulsion nozzle and the engine intake opening and capable of discharge to prevent the discharge from the propulsion nozzle entering the engine intake opening, and a valve for controlling flow through the addditional nozzle.

By way of example the invention will now be described with reference to the drawings, in which:

FIGURES 1 and 2 are respectively side and front views of an aircraft provided with a jet propulsion engine according to the present invention, and FIGURE 3 is a plan view with the aircraft partly cut away to show the engine in section.

The fuselage 10 of a V/S.T.O.L. aircraft houses a two-spool gas turbine jet propulsion engine behind the pilot's cockpit 11. A bifurcated intake 12 with forward-facing openings 13 on either side of the cockpit conveys air to a low pressure compressor 14. The discharge from the compressor 14 is divided, one part entering a high pressure compressor 15 and thereafter passing through a main combustor 16, a turbine 17, a forked exhaust duct 18 and a pair of swivellable pipe bend nozzles 19. The other part enters a plenum chamber 20 which surrounds the casing of the compressor 15. The outer wall of the plenum chamber merges into two laterally projecting ducts 21 to the outer ends of which are attached a pair of swivellable pipe bend nozzles 22. Auxiliary combustion systems 23 are provided in the ducts 21 for burning fuel in the low pressure air supplied to the nozzles 22 to provide increased thrust. The front pair of air nozzles 22 and the rear pair of exhaust gas nozzles 19 are swivellable together about transverse axes between a downwards-discharging position for V.T.O.L. and a rearwards-discharging position for forward propulsion. Side fairings 24 in front of the main propulsion nozzles reduce the drag during forward flight.

When the pairs of nozzles are swivelled downwards for vertical take-off or for hovering with minimum ground clearance, each downwardly-directed jet discharging from one of the nozzles 19 and 22, strikes the ground and tends to spread equally in all directions. Between the jets issuing from two adjacent nozzles, such as the two nozzles 22, the gases from the two jets, which are spreading across the ground, meet and rise upwards in an upcurrent. Because the jets from the nozzles 22 are discharging at substantially equal rates and the nozzles are equi-distant from the fore-and-aft centreline of the aircraft, this upcurrent is formed along the fore-and-aft centreline. The upcurrent rises and strikes the underside of the fuselage and spreads upwards around the fuselage; a substantial amount of the upcurrent travels forwards along the fuselage underside and is ingested at the intake openings 12.

This ingestion of the gases discharged from the nozzles 22 has a deleterious effect on the performance of the aircraft because the gases from the nozzles 22 are at a temperature greater than ambient, because they are taken from the low pressure compressor output, and on ingestion at the engine intake they raise the turbine entry temperature thus lowering the thrust output of the engine.

The problem is aggravated if it is desired to bring the auxiliary combustion systems 23 into use to provide extra upthrust for example, to assist V/S.T.O.L. with a high payload. In these circumstances the jets from the front nozzles 22 would not be just warm air jets but combustion gas jets of greater velocity. Ingestion of hot combustion gases could raise the temperature of the air entering the engine so much that the whole of the additional thrust achieved by using the auxiliary combustion system would be lost.

With any ingestion of discharged gases ground debris could be carried into the engine intake and with ingestion of the high velocity hot gas discharge from the front nozzles ground debris is even more likely to be ingested. A further problem which arises with the use of the auxiliary combustion systems 23 is that there is a greater mass flow leaving the plenum chamber 20 and if this increased flow had to be delivered through the front nozzles the area of these nozzles would have to be increased. The invention seeks to overcome all these problems in the following manner.

An additional fixed nozzle 25 is provided in the under surface of the fuselage to discharge downwards at a point between the intake openings 13 and the front nozzles 22 to prevent the discharge from the front nozzles entering the intake openings. The nozzle 25 is located on the centreline of the aircraft, that is in the plane lying equi-distant from the two nozzles 22, and is therefore appropriately positioned to direct a gas jet in opposition to the upcurrent fromed along the centreline when the aircraft is performing a vertical take-off or is hovering with minimum ground clearance.

The nozzle 25 communicates upstream through an additional duct 26 with the lower portion of the plenum chamber 20, i.e. at a point upstream of both combustion systems 23. The duct 26 is provided with means for controlling the flow of compressed air from the plenum chamber through the duct, which control is shown here in the form of a butterfly valve 27. The area of the nozzle 25 is chosen to provide the required increase in nozzle area to match the increased flow which results from use of the combustion systems 23.

During normal engine operation, the valve 27 is closed, the nozzle 25 is thereby inoperative and the four nozzles 19, 22 discharge their exhaust gas jets and air jets respectively. If vertical take-off or hovering with minimum ground clearance is required, with or without the additional thrust obtained by the use of the auxiliary combustion systems 23, the pairs of nozzles are swivelled downwards. The valve 27 is opened and a proportion of the plenum chamber air is tapped off through duct 26 to be discharged through nozzle 25.

When the auxiliary combustion systems 23 are not in use the air discharged by the nozzle 25 prevents engine ingestion of discharged air and ground debris. When the auxiliary combustion systems 23 are in use, the use of the nozzle 25 effectively increases the total nozzle area for the plenum chamber flow while at the same time reducing the amount of air which flows through the combustion systems 23. This arrangement will produce an additional rise in the temperature of the gas flow through the nozzles 22 but on the other hand it permits the nozzles 22 to be sized to match only normal operation conditions. Their size and drag are thus reduced and the requirement for nozzles of variable area is avoided.

Because the duct 26 is fed with air from upstream of the comustion systems 23, the nozzle 25 discharges a jet of air which is relatively cold and of low velocity as compared to the hot air discharged from the nozzles 22 when the systems 23 are operating, and this cold air forms a protective fluid barrier between the intake openings 13 and the hot gas discharged from the nozzles 22, which barrier at least partially protects the openings from ingestion of hot gas and debris. A further advantage obtained is that the discharge from nozzle 25 cools the extended nosewheel 30 and prevents it from being overheated by the hot gas discharged from the nozzles 22.

The additional nozzle 25 may be of any other suitable shape, for example, an elongate slot extending transversely of the aircraft. Alternatively, the single nozzle 25 may be replaced by a plurality of nozzles fed from a common duct. One or more baffles 40 (as shown in FIG. 2) may be provided to direct the discharge from the additional nozzle away from the engine intake opening. In one example the nozzle 25 provides about 27% of the total front nozzle area and thus can also contribute a substantial upthrust.

The valve 27 may be operated either independently or by means responsive to the control or operation of the combustion systems 23.

What we claim is:

1. An aircraft comprising gas turbine engine means having compressor means, combustion means and turbine means, port and starboard swivellable nozzle for receiving air compressed by the compressor means, means for swivelling said nozzles simultaneously between positions in which the direction of discharge is primarily rearwards and primarily downwards respectively, air intake means for the supply of air to the gas turbine engine means, and additional nozzle means arranged to receive air from said compressor means, characterized in that in operation with the aircraft in close proximity to the ground and said two swivellable nozzles discharging downwardly the jets therefrom strike the ground, spread along the ground and interact to cause an upcurrent tending at least partially to flow towards said air intake means, and said additional nozzle means is positioned for the flow therefrom to deflect said upcurrent away from said air intake means.

2. An aircraft according to claim 1 in which said air intake means comprises two air intakes and said additional nozzle means is disposed between the air intakes and the swivellable nozzles.

3. An aircraft according to claim 1 including main ducting for conducting air compressed by said compressor means to said swivellable nozzles, an auxiliary combustion system in the ducting, characterized in that additional ducting is provided for conducting air from said main ducting at a location upstream of said auxiliary combustion system to said additional nozzle means.

4. An aircraft according to claim 3 wherein the swivellable nozzles are of fixed flow cross-sectional area, characterized in that the cross-sectional area of said additional nozzle means is such that the flow through said additional nozzle means in operation enables the increased flow through said first nozzles when said auxiliary combustion system is operating to be accommodated.

5. An aircraft according to claim 1, characterized in that baffles are disposed adjacent the additional nozzle means for directing the discharge therefrom away from the engine intake means.

6. An aircraft according to claim 1, characterized in that said additional nozzle means comprises a single circular nozzle having a flow cross-sectional area of the same order of magnitude as the flow cross-sectional area of each of the swivellable nozzles.

References Cited

UNITED STATES PATENTS 2,912,188   11/1959   Singelmann et al. _____ 244—12
3,310,951    3/1967   Marchant _____ 60—271

FOREIGN PATENTS 898,417   6/1962   Great Britain.
1,199,626   8/1965   Germany.

MILTON BUCHLER, Primary Examiner.

JAMES E. PITTENGER, Assistant Examiner.

U.S. Cl. X.R.

60—225